United States Patent
Esser

(10) Patent No.: US 9,132,517 B2
(45) Date of Patent: Sep. 15, 2015

(54) METHOD FOR PRODUCING A PISTON RING

(75) Inventor: Peter-Klaus Esser, Kuerten (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 20 days.

(21) Appl. No.: 13/823,040

(22) PCT Filed: Sep. 2, 2011

(86) PCT No.: PCT/DE2011/001684
§ 371 (c)(1),
(2), (4) Date: Mar. 13, 2013

(87) PCT Pub. No.: WO2012/045294
PCT Pub. Date: Apr. 12, 2012

(65) Prior Publication Data
US 2013/0181411 A1     Jul. 18, 2013

(30) Foreign Application Priority Data
Oct. 7, 2010  (DE) .......................... 10 2010 047 836

(51) Int. Cl.
*F16J 9/26* (2006.01)
*B23P 15/06* (2006.01)
*F16J 9/20* (2006.01)

(52) U.S. Cl.
CPC .............. *B23P 15/06* (2013.01); *F16J 9/206* (2013.01); *F16J 9/26* (2013.01); *Y10T 29/49281* (2015.01)

(58) Field of Classification Search
CPC .............. F16J 9/26; F16J 9/206; B23P 15/06; Y10T 29/49281

USPC .................................. 277/434, 440, 442, 443
See application file for complete search history.

(56) References Cited

U.S. PATENT DOCUMENTS

| 3,337,938 | A | | 8/1967 | Prasee |
|---|---|---|---|---|
| 4,323,257 | A | | 4/1982 | Kondo et al. |
| 5,295,696 | A | * | 3/1994 | Harayama et al. ............ 277/443 |
| 6,206,379 | B1 | | 3/2001 | Toshiaki |
| 6,698,763 | B2 | * | 3/2004 | Ogawa et al. ................. 277/434 |
| 7,024,982 | B2 | * | 4/2006 | Aizawa et al. ................. 92/208 |
| 8,235,393 | B2 | * | 8/2012 | Esser et al. .................... 277/440 |
| 2002/0117808 | A1 | * | 8/2002 | Ogawa et al. ................. 277/443 |
| 2002/0190476 | A1 | | 12/2002 | Preyer |
| 2007/0128807 | A1 | | 6/2007 | Fischer et al. |
| 2010/0044967 | A1 | | 2/2010 | Esser et al. |

(Continued)

FOREIGN PATENT DOCUMENTS

| CN | 200958429 | 10/2007 |
|---|---|---|
| CN | 201269146 | 7/2009 |

(Continued)

*Primary Examiner* — Gilbert Lee
(74) *Attorney, Agent, or Firm* — Jordan and Hamburg LLP

(57) ABSTRACT

A piston ring, is produced by providing, on the radially outer circumferential surface of a ring-shaped metallic main body, a recess, the metallic main body having a radially outer circumferential surface, a radially inner circumferential surface, and flank surfaces interposed therebetween providing the recess with a contour that deviates from a cylindrical shape at least on the bottom of the recess, providing at least one wear-resistant layer on the outer circumferential surface, including the recess, and at least partially removing an area of the at least one wear-resistant layer on the outer circumferential surface and including an area corresponding to a scraping edge, thereby forming a land having a predefinable width.

14 Claims, 3 Drawing Sheets

(56) References Cited

U.S. PATENT DOCUMENTS

| | | |
|---|---|---|
| 2010/0044969 A1 | 2/2010 | Fischer et al. |
| 2012/0205876 A1 | 8/2012 | Fujimura et al. |
| 2012/0298067 A1 | 11/2012 | Esser |
| 2013/0187341 A1* | 7/2013 | Esser et al. .................... 277/442 |
| 2014/0008874 A1* | 1/2014 | Esser ............................ 277/443 |
| 2014/0197602 A1* | 7/2014 | Lahrman ....................... 277/443 |

FOREIGN PATENT DOCUMENTS

| | | |
|---|---|---|
| DE | 27 28 725 | 3/1979 |
| DE | 103 59 802 | 3/2005 |
| DE | 10 2006 046 915 | 3/2008 |
| DE | 10 2010 001 434 | 8/2011 |
| GB | 1441961 | 7/1976 |
| JP | 58-12414 | 1/1983 |
| JP | 59-86752 | 5/1984 |
| JP | 2007-270880 | 10/2007 |
| JP | 2009-287730 | 12/2009 |
| JP | 4418660 | 12/2009 |
| WO | WO-2008/098534 | 8/2008 |
| WO | WO-2011/064888 | 6/2011 |

* cited by examiner

METHOD FOR PRODUCING A PISTON RING

BACKGROUND OF THE INVENTION

The invention relates to a method for producing a piston ring.

It is known in general that the running surface of the ring is recessed on one side, or fully recessed, so as to improve the scraping action, in particular of compression piston rings. It is likewise generally known that chrome layers are applied to the running surfaces of compression piston rings provided with recesses.

WO 2008/098534 A1 discloses a piston ring, comprising a main body that has a running surface provided with a recess, an upper and a lower flank face, and an inner circumferential surface. At least one PVD (physical vapor deposition) coating layer is applied to the running surface, so that, in the finished state, the main body comprises the coating layer only on the edge region side, which is to say outside the recess. Here, in the region of the edge, it is possible for the relatively hard PVD layer to chip during operation, whereby the scraping action of the edge is reduced.

DE 10 2006 046 915 B3 discloses a piston ring for internal combustion engines, in the form of a base, in particular made of steel or cast iron, with a wear protection coating made of a periodic multi-layer system, wherein each periodicity consists of at least two individual layers made of metal nitrites.

SUMMARY OF THE INVENTION

It is the object of the invention to provide an alternative method for producing piston rings that are provided with at least one PVD layer, in which the piston ring has improved scraping action and a lower risk of chipping than in the prior art.

Moreover, a piston ring having improved chipping resistance, particularly in the region of the scraping edge (functional edge), is to be provided.

This object is achieved by nitriding at least sub-regions of the running surface and/or a recess provided as hereafter described and subsequently providing a PVD topcoat or a multi-layer system on the running surface.

This object is also achieved by a piston ring that is produced according to this method and advantageously is recessed on one side on the running surface side, or is fully recessed, wherein a contour that deviates from a cylindrical shape is introduced on the bottom of the recessed region of the running surface and the recessed region of the running surface is provided with at least one wear-resistant layer when the piston ring is finished.

The method according to the invention and the piston ring produced thereby can be used to improve the scraping action of the sharp scraping edge that is formed. Because no wear-resistant (hard) material is present in the region of the scraping edge, a self-sharpening scraping edge (functional edge) is formed, which is not subject to the risk of chipping.

The respective contour in the region of the bottom of the recess is advantageously introduced mechanically, such as by machining, e.g., grinding.

Depending on the application case, it may be useful to provide the bottom of the recessed region with a contour that is oblique in a rectilinear manner or curved.

If desired, the running surface can either be only provided with a PVD or DLC (diamond-like carbon) topcoat, or have a multi-layer system employed, as described in DE 10 2006 046 915 B3.

According to a further aspect of the invention, the land width of the running surface that is exposed particularly after cylindrical machining, is from 0.05 to 0.45 mm.

The piston ring main body can be made of cast iron, cast steel, or steel wire, wherein, depending on the selected starting material, the scraping edge can be sharp-edged, rounded, or provided with bevels.

For example, in the case of a cast iron piston ring, the scraping edge can be configured to be sharp-edged (90°) or rounded having a radius not exceeding 0.2 mm, preferably of 0.1 mm.

In the case of a steel ring, the region of the scraping edge can be nitrided or unnitrided. In the non-nitrided embodiment, the scraping edge can likewise be generated to be sharp-edged (90°).

In the nitrided steel ring embodiment, the following ring configurations may be provided:

the scraping edge contains a radial indent or chamfer not exceeding 0.1 mm, and the steel land and the running surface are nitrided, wherein after completion of the piston ring no nitride layer is present beneath the PVD topcoat;

the scraping edge is provided with a bevel or chamfer not exceeding 0.15 mm, and the steel land and the running surface are nitrided, wherein a nitride layer remains beneath the PVD topcoat in the finished piston ring; the external angle formed by the chamfer and the lower flank preferably does not exceed 30°.

Depending on the material and application, piston rings, and more particularly compression piston rings that are provided with at least one wear-resistant layer, preferably a PVD layer, or a multi-layer system, can thus be generated.

If the PVD layer is to be the sole topcoat, the same is approximately cylindrically removed in the region of the scraping edge down to the base material, whereby a coating-free land having a predefinable width is generated.

If several wear layers are present, the PVD topcoat can either be ground down to the base material of the running surface, or only as much as is needed for at least a wear-resistant layer (for example a nitride layer) to remain beneath the PVD top coat.

Depending on the application case, it may likewise be useful to provide the finished and coated running surface with a convex profile, for example by way of lapping or honing.

BRIEF DESCRIPTION OF THE DRAWINGS

The subject matter of the invention is shown in the drawings based on an exemplary embodiment and is described as follows. In the drawings:

FIG. 1A shows an enlarged view of a piston ring main body 1, which has already been provided with a recess 2 on one side. Initially, a land 4 remains in what will later be the scraping edge 3. The bottom 5 of the recess 2 is provided with a profile 6 that deviates from a cylindrical shape and is convex.

Figure 1A:
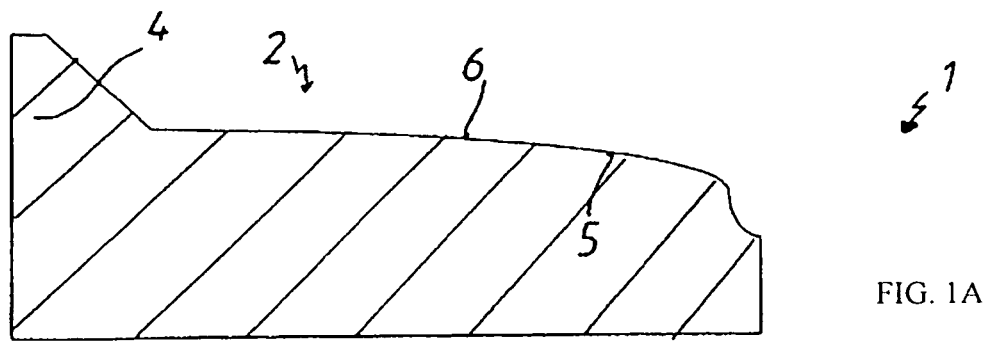
FIGS. 1A, 1B, 1C show a production process for a piston ring that is recessed on one side.
Figure 1B:
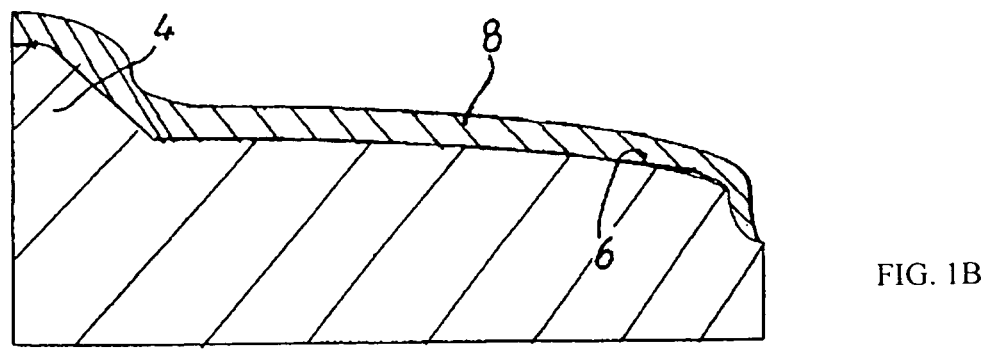

It is apparent from FIG. 1B that a PVD topcoat 8 was applied to what will later be the running surface 7, the topcoat following the contour of the land 4 on one side and that of the bottom 6 on the other.

As an alternative, a wear protection coating in accordance with DE 10 2006 046 915 B3 can be applied to the bottom 6 and the land 4, respectively.

Figure 1C:
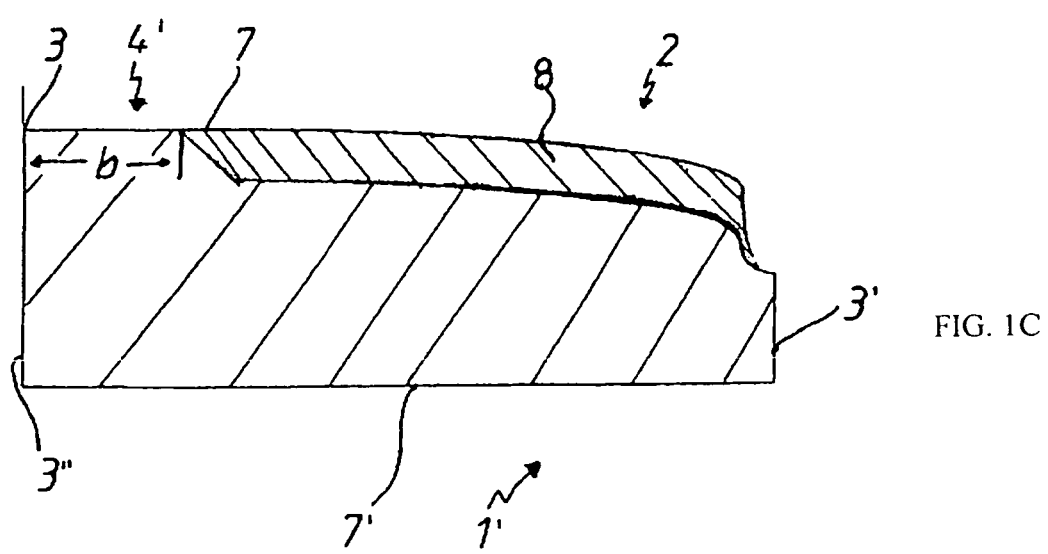

FIG. 1C shows the finished piston ring 1'. The land 4, which was still apparent in the illustration at the center, has been removed so far that a land 4' having a predefinable width b was formed, which now contains the scraping edge 4 that is sharp-edged in this illustration. The finished piston ring 1' thus has the PVD topcoat 8 only in the region of the recess 2, while the land 4' is coating-free over the width b thereof. This measure forms a scraping edge 3 that during operation is continually self-sharpening. Also apparent is the inner circumferential surface 7', which is located radially opposite the running surface 7, and the upper and lower flank surfaces 3', 3".

Figure 2A:
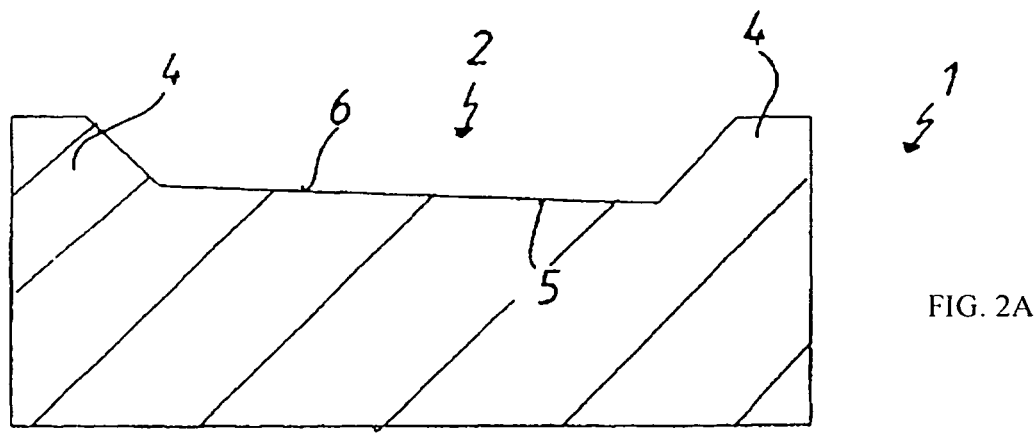
FIGS. 2A, 2B, 2C show a production process for a piston ring that is fully recessed.
Figure 2B:
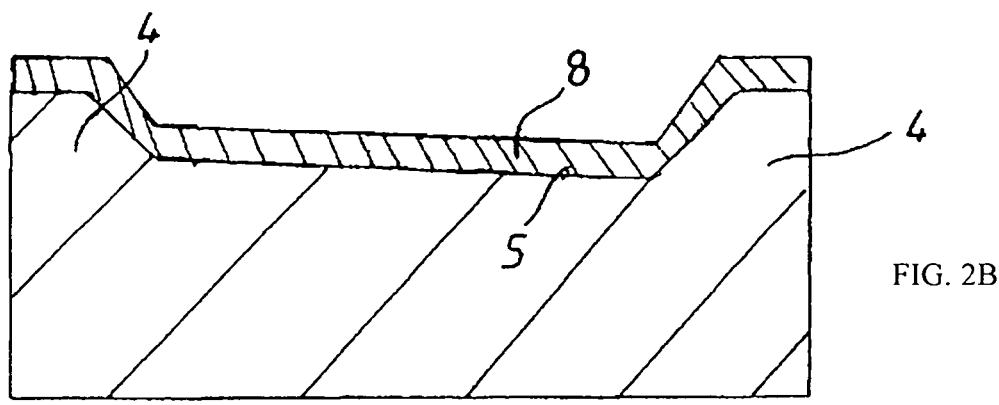
Figure 2C:
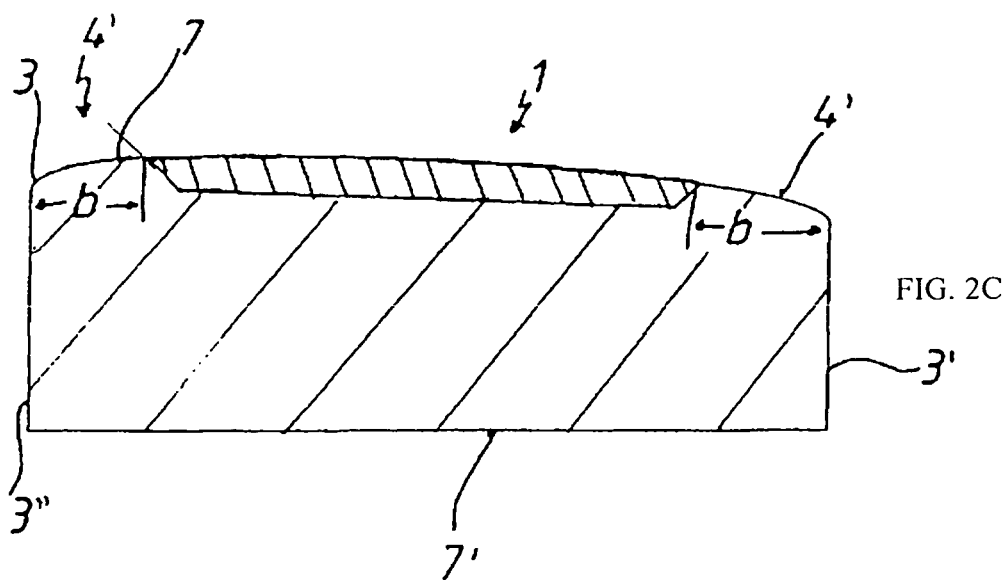

The piston ring main body 1 shown in FIG. 2A has a so-called full recess 2, about which two outer lands 4 are present. Again, the bottom 5 is configured to have a contour 6 that has an oblique progression in a rectilinear manner. It is apparent from FIG. 2B that either an individual PVD topcoat 8 or a multi-layer system has been applied to what will later be the running surface 7, the topcoat or multi-layer system following the contours of both the lands 4 and the bottom 5. Departing from FIGS. 1A, 1B, 1C, what will later be the scraping edge 3 is not configured to be sharp-edged, but has a radius having a predefinable dimension. Also departing from FIGS. 1A, 1B, 1C, the running surface 7 has two lands 4', each of a respective predefinable width b, and the running surface 7 has undergone a cylindrical lapping step both in the regions of the now present lands 4' and of the recess 2. Also apparent are the inner circumferential surface 7', the upper 3' and the lower flank surface 3".

Figure 3A:
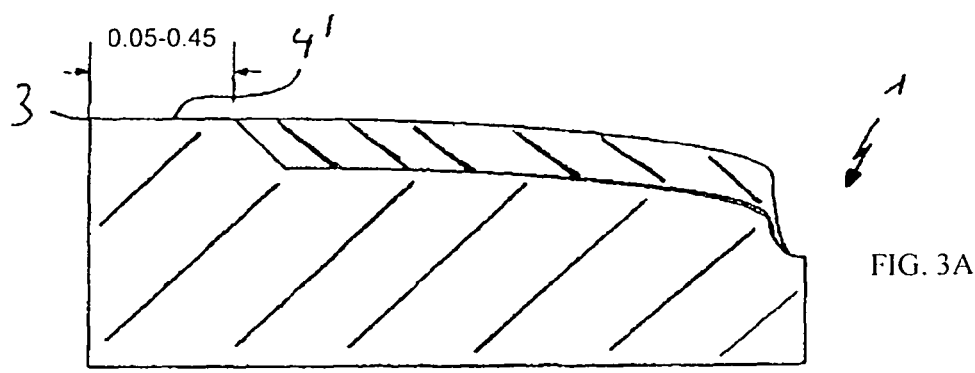
FIGS. 3A, 3B, 3C show different embodiments of the scraping edge of a piston ring that is recessed on one side in accordance with FIGS. 1A, 1B, 1C.
Figure 3B:
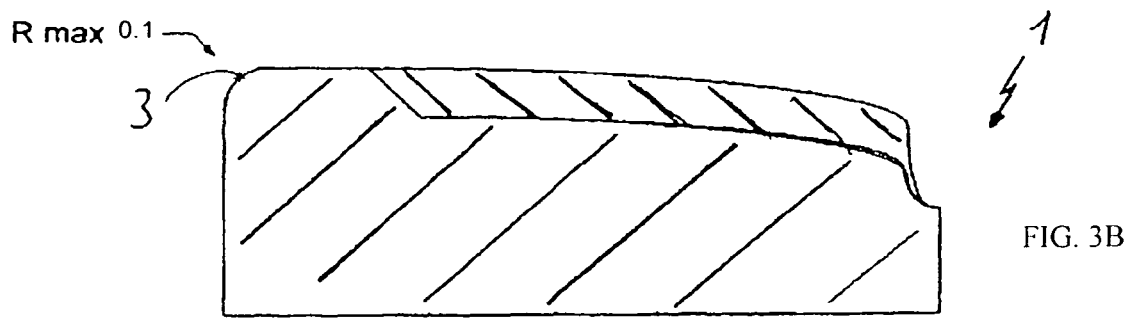
Figure 3C:
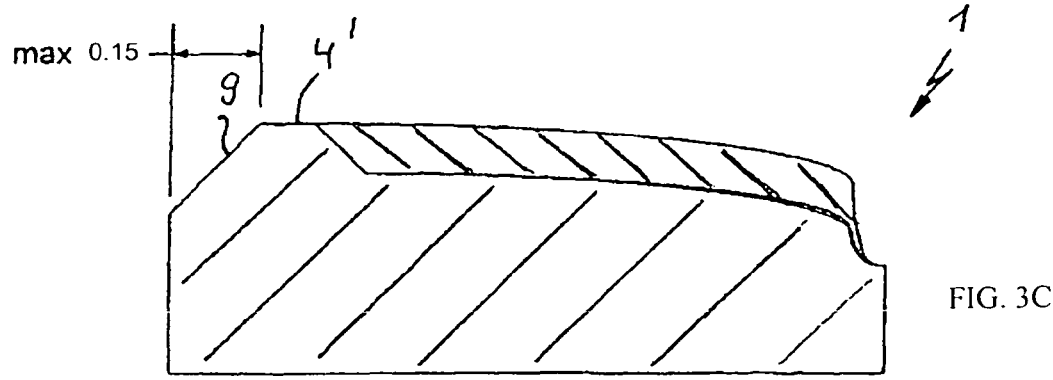

FIGS. 3A, 3B, 3C show different embodiments of a finished piston ring 1. The contour is based on FIG. 1C. Apparent from FIG. 3A are the sharp scraping edge 3 and the land 4' which in this example should have a width between 0.05 and 0.45 mm.

It is apparent from FIG. 3B that the scraping edge 3 should have a maximum radius R of 0.1 mm.

FIG. 3C shows that the land 4' extends into the lower ring flank of the piston ring 1 over a chamfer 9 having a maximum total width of 0.15 mm.

The invention claimed is:

1. A method of producing a piston ring, comprising:
   producing a ring-shaped metallic main body, the main body having a radially outer circumferential surface, a radially inner circumferential surface and upper and lower flank surfaces interposed therebetween;
   providing a recess on the outer circumferential surface, a base surface of the recess adjacent the upper flank being contoured so that said base surface is non-cylindrical;
   providing at least one wear-resistant layer on at least the outer circumferential surface; and
   partially removing the at least one wear-resistant layer to form a running surface of the piston ring including a land of predetermined width from which the at least one wear layer has been removed, with the piston ring having a scraping edge contiguous with the land and with the lower flank,
   wherein the wear-resistant layer is a multilayer system including a layer provided by nitriding and a topcoat provided by physical vapor deposition (PVD), and
   wherein an intervening surface occurs between a distal scraping surface of said land and the base surface of said recess.

2. The method of claim 1, wherein the recess is provided by machining the ring-shaped metallic main body.

3. The method of claim 1, wherein the base surface is oblique with respect to an axis of the piston ring.

4. The method of claim 1, wherein the nitriding includes the scraping edge, and the wear-resistant layer provided on the scraping edge by the nitriding remains after the partial removing of the at least one wear-resistant layer.

5. The method of claim 1, wherein the scraping edge is sharp-edged, being defined by intersection of the land with the lower flank at 90°.

6. The method of claim 1, wherein the scraping edge is rounded with a radius of curvature not exceeding 0.2 mm.

7. The method of claim 1, wherein the scraping edge is chamfered with the chamfer meeting the lower flank at an angle not exceeding 30°.

8. The method of claim 1, wherein the metallic main body is made of cast iron, cast steel or steel wire.

9. The method of claim 1, wherein the base surface of the recess is convex.

10. A compression piston ring produced by the method of claim 1.

11. The compression piston ring of claim 10, wherein the base surface of the recess is oblique.

12. The compression piston ring of claim 10, further comprising a physical vapor deposition (PVD) topcoat on surfaces of the recess.

13. The compression piston ring of claim 10, further comprising a multi-layer system on surfaces of the recess.

14. The compression piston ring of claim 10, wherein the base surface of the recess is convex.

\* \* \* \* \*